United States Patent
Sanders et al.

(10) Patent No.: US 11,028,305 B2
(45) Date of Patent: Jun. 8, 2021

(54) DELAYED BREAKER COMPOSITION

(71) Applicant: HALLIBURTON ENERGY SERVICES, INC., Houston, TX (US)

(72) Inventors: Michael W. Sanders, Houston, TX (US); James Ogle, Livingston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 139 days.

(21) Appl. No.: 16/317,748

(22) PCT Filed: Sep. 9, 2016

(86) PCT No.: PCT/US2016/051071
§ 371 (c)(1),
(2) Date: Jan. 14, 2019

(87) PCT Pub. No.: WO2018/048428
PCT Pub. Date: Mar. 15, 2018

(65) Prior Publication Data
US 2019/0309209 A1 Oct. 10, 2019

(51) Int. Cl.
| | |
|---|---|
| *C09K 8/08* | (2006.01) |
| *C09K 8/575* | (2006.01) |
| *C09K 8/90* | (2006.01) |
| *C09K 8/68* | (2006.01) |
| *C09K 8/70* | (2006.01) |
| *C09K 8/80* | (2006.01) |

(52) U.S. Cl.
CPC ............. *C09K 8/08* (2013.01); *C09K 8/5756* (2013.01); *C09K 8/68* (2013.01); *C09K 8/70* (2013.01); *C09K 8/80* (2013.01); *C09K 8/90* (2013.01); *C09K 8/706* (2013.01); *C09K 2208/26* (2013.01)

(58) Field of Classification Search
CPC .... C09K 2208/26; C09K 8/08; C09K 8/5756; C09K 8/68; C09K 8/70; C09K 8/706; C09K 8/80; C09K 8/90
See application file for complete search history.

(56) References Cited

U.S. PATENT DOCUMENTS

| | | |
|---|---|---|
| 6,613,720 B1 | 9/2003 | Feraud et al. |
| 6,861,394 B2 | 3/2005 | Ballard et al. |
| | (Continued) | |

FOREIGN PATENT DOCUMENTS

WO 2012116032 A1 8/2012

OTHER PUBLICATIONS

International Search Report and Written Opinion; PCT Application PCT/US2016/051071; dated Jun. 1, 2017.

(Continued)

*Primary Examiner* — Frances Tischler
(74) *Attorney, Agent, or Firm* — Polsinelli PC

(57) ABSTRACT

A downhole fluid composition having a saccharide gelling agent, an oxidative breaker, and a sequestering agent. The sequestering agent is hydrocarbon miscible and inert to oxidation by the oxidative breaker. The sequestering agent sequesters the oxidative breaker or an activator for the oxidative breaker, whereby oxidation of the gelling agent is inhibited. The downhole fluid may also include a proppant. Upon contacting hydrocarbons downhole or reaching a predetermined temperature, the sequestering agent releases the oxidative breaker or activator thereby oxidizing the saccharide gelling agent.

10 Claims, 3 Drawing Sheets

(56) References Cited

U.S. PATENT DOCUMENTS

| | | |
|---|---|---|
| 8,084,401 B2 | 12/2011 | Lukocs et al. |
| 8,415,278 B2 | 4/2013 | Sanders et al. |
| 2008/0099207 A1 | 5/2008 | Venditto et al. |
| 2008/0173452 A1 | 7/2008 | Sanders et al. |
| 2010/0089580 A1* | 4/2010 | Brannon ............... E21B 43/267 166/280.2 |
| 2011/0152132 A1 | 6/2011 | Sanders et al. |
| 2013/0324445 A1 | 12/2013 | Quintero et al. |
| 2016/0032174 A1 | 2/2016 | Fuller et al. |

OTHER PUBLICATIONS

Office Action; Canadian Application; Application No. 3,027,514; dated Jul. 7, 2020.

\* cited by examiner

DELAYED BREAKER COMPOSITION

CROSS-REFERENCE TO RELATED APPLICATIONS

This application is a national stage entry of PCT/US2016/051071 filed Sep. 9, 2016, said application is expressly incorporated herein in its entirety.

FIELD

The present disclosure relates to fluids containing internal breakers which are injected into subterranean wellbores. In particular, the present disclosure relates to a composition having an internal breaker for delayed breaking of a gelling agent, its preparation and use.

BACKGROUND

In order to produce oil or gas, a wellbore is drilled into a subterranean formation, which may include a hydrocarbon reservoir or may be adjacent to a hydrocarbon reservoir. During various phases of wellbore stimulation and production, higher viscosity treatment fluids may be employed to suspend desired components for delivery downhole or for controlling fluid flow downhole. To this end, gelling agents may be provided to a base treatment fluid to achieve the desired viscosity.

However, once downhole, it may be further desirable to reduce viscosity in order to release suspended components or to re-circulate the gelling agents back to the surface and to not impede production. In order to do so, components referred to as "breakers" are often used. Breakers have the effect of reducing the viscosity of the gelled fluid, dissociating, rupturing or breaking longer chain molecules making up the gelling agent into shorter ones, or otherwise "breaking" the gelling agent or gelled fluid. Breakers may be provided as part of the treatment fluid delivered downhole, in which case they may be referred to as internal breakers, whereas, breakers which are provided from an outside source may be referred to as external breakers.

Activators may be added to the treatment fluid so as to initiate, or increase the activity of the breakers. In this way breaking of the gelling agent can be further controlled.

BRIEF DESCRIPTION OF THE DRAWINGS

Implementations of the present technology will now be described, by way of example only, with reference to the attached figures, wherein.

DETAILED DESCRIPTION

Figure 1:
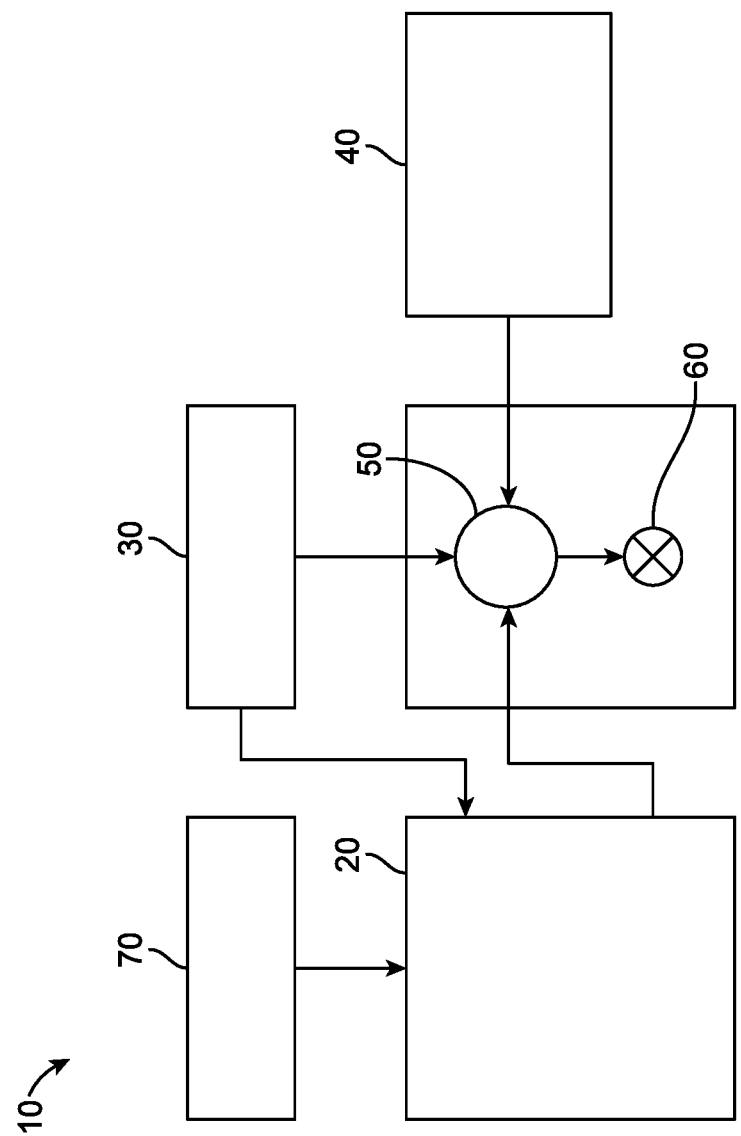
FIG. 1 is a diagram illustrating an example of a fracturing system that may be used in association with certain aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

In the following discussion and in the claims, the terms "including" and "comprising" are used in an open-ended fashion, and thus should be interpreted to mean "including, but not limited to . . . ". As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

The present disclosure is directed to a composition for controlled or delayed release or activation of an internal breaker. The composition disclosed herein includes gelling agents which may be provided to increase the viscosity or gel a base fluid. In particular, the gelling agents for the composition of the present disclosure include saccharide gelling agents. The composition includes an internal breaker for breaking the composition once provided downhole or injected into a desired environment. The internal breaker is an oxidative breaker, including any oxidative agent or compound that gives rise to an oxidative agent. In particular, the oxidative agents produce, directly or indirectly, hydrogen peroxide and/or peracids. The composition may include an activator for the oxidative breaker. The activator may act to initiate or increase the rate of oxidation or activity of the oxidative breaker.

The breaking of the gel may be delayed or controlled by sequestering the oxidative breaker from the gelling agent or otherwise inhibiting reaction of the oxidative breaker with the saccharide gelling agent. As disclosed herein, this may be done by including a sequestering agent that is inert to oxidation by the breaker and which is miscible with hydrocarbons. The sequestering agent may be a hydrocarbon compound, and may include a straight chain C2-C40 alkane or C2-C40 alkyl containing compound. The sequestering agent may include any compound which is inert to oxidation by the oxidative agent and has a straight chain C2-C40 alkyl component, including alcohol, siloxane, ether, ketone, aldehyde, or mixture thereof, and having a straight chain C2-C40 alkyl component. The activator agent may include surfactants, mineral oils, natural or synthetic oils, waxes, or the like, having a straight chain C2-C40 alkyl component.

The composition may include a first and second phase. The first phase may be an aqueous fluid having the saccharide gelling agent dissolved or dispersed therein, and may be referred to herein as the base fluid. The second phase may include the sequestering agent and the oxidative breaker or the activator. The collapse of the second phase or removal of the inert agent releases the oxidative breaker or activator to the first phase thereby acting to break the gelling agent. The activator may be included in the first or second phase. If the activator is sequestered then the oxidative agent can be provided in the same fluid or phase as the gelling agent. By sequestering the activator, the oxidation activity of the oxidative agent may be inhibited or reduced until release. The sequestering agent may be first mixed with the oxidative breaker or the activator agent and then mixed with the base fluid having the gelling agent, prior to or during pumping downhole, thereby forming two phases.

Given that the sequestering agent inert to oxidation is miscible with hydrocarbon, once provided in a downhole environment, a hydrocarbon from an external source such as the formation, or pumped from the surface, may contact the sequestering agent. The hydrocarbon may act as a solvent for the inert agent, collapsing the phase and together forming a homogenous mixture thereby releasing the oxidative breaker or activator. Once the oxidative breaker is released, it may contact the gelling agent causing oxidation and breaking of the gelling agent and composition. Alternatively, or additionally, the sequestering agent inert to oxidation may also release the oxidative agent or activator at certain high temperatures, such as 90° F. or more, or alternatively 120° F. or more, or a predetermined temperature. The high temperature can cause a phase change or otherwise collapse the sequestering agent and release sequestered compound to act on the gelling agent.

The inclusion of the sequestering agent permits control and delayed release of the breaker. For example the oxidative breaker may be initially inactive or react very slow. Once downhole, the oxidative breaker can be released and activated after contact with a hydrocarbon, or by pumping a hydrocarbon solvent downhole to contact the composition and release the oxidative breaker or activator.

Additionally, a separate internal breaker for the gelling agent can be provided. If the separate internal breaker is insufficient to break the gel, then a hydrocarbon solvent can be injected downhole to release the oxidative breaker for additional breaking of the composition.

The following provides a more detailed discussion of the components herein.

Gelling Agent

The composition disclosed herein may include a saccharide gelling agent for thickening and increasing the viscosity of the composition. The saccharide gelling agent includes any saccharide, including monosaccharides, disaccharides, oligosaccharides, polysaccharides, as well as cellulose, starches, gums, and derivatives of all the aforementioned, whether naturally or synthetically produced.

Cellulose may be cellulose ethers or cellulose ether derivatives including methyl cellulose (MC), ethyl cellulose (EC), carboxymethyl cellulose (CMC), hydroxyethyl cellulose (HEC), carboxymethylhydroxyethyl cellulose (CMHEC), hydroxyethyl cellulose (HEC), ethyl hydroxyethyl cellulose (EHEC), methylcellulose (MC), hydroxpropylcellulose (HPC), methylhydroxyethyl cellulose (MHEC) and methylhydroxypropyl cellulose (MHPC).

The saccharides herein may further include chitosan, diutan, xanthan gum, welan gum, succinoglycan, Scleroglucan, tragacanth gum, karaya gum, galactomannans, guar, and the like, and mixtures thereof. Specific guars may include hydroxypropyl guar ("HPG"), carboxymethyl guar ("CMG"), carboxymethylhydroxypropyl guar ("CMHPG").

Gelling agents may also include acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides and the like.

The gelling agents may be cross-linked to improve gellation. Crosslinking agent(s) may be selected from those organic and inorganic compounds. Exemplary organic crosslinking agents include, but are not limited to, aldehydes, dialdehydes, phenols, substituted phenols, ethers, and mixtures thereof. Typical inorganic crosslinking agents include polyvalent metals, chelated polyvalent metals, and compounds capable of yielding polyvalent metals. Inorganic crosslinking agents include chromium salts, complexes, or chelates, such as chromium nitrate, chromium citrate, chromium acetate, chromium propionate, chromium malonate, chromium lactate, etc.; aluminum salts, such as aluminum citrate, aluminates, and aluminum complexes and chelates; titanium salts, complexes, and chelates; zirconium salts, complexes or chelates, such as zirconium lactate; and boron containing compounds such as boric acid, borates, and boron complexes.

The gelling agents can be added to the suspension composition herein in a range of from about 10 to 2000 lbs/1,000 gal, alternatively from about 100 to 1500 lb/1,000 gal, alternatively at a concentration of from about 0.1% to 2.4% weight/volume (e.g., g/100 ml).

Breaker

Breakers are incorporated into the composition and so may be referred to as internal breakers. The breakers disclosed herein can be added to the composition prior to, during, or after introduction into the wellbore. Breakers are used to "break" a gelled form of the suspension composition. This can be done by breaking apart any polymeric components, removing or reducing the extent of cross-linking, or otherwise reducing the viscosity or thickness of the gel.

The breakers herein are oxidative breakers, and may include any oxidative agents or compounds which produce oxidative agents. In particular, exemplary oxidative agents herein include peroxides, and components which produce hydrogen peroxide and/or per-acids, directly or indirectly.

The source of hydrogen peroxide is selected from the group consisting of inorganic persalts, alkali metal peroxides (e.g. sodium peroxide), organic peroxide (e.g. urea-hydrogen peroxide), hydrogen peroxide, organic peroxides, and any combination thereof. Persalts include, for example, and without limitation, alkali perborates, percarbonates, perphosphates, and any combination thereof. Specific examples of these, without limitation, sodium perborate monohydrate, sodium perborate tetrahydrate, sodium percarbonate, sodium pyrophosphate peroxyhydrate.

In crystalline form, sodium perborate exists as a dimeric cyclic peroxodiborate salt which when provided to aqueous media or phase rapidly hydrolyzes to form an equilibrium solution of hydrogen peroxide, tetrahydroxy borate anions, and one or more peroxyborate species. The equilibrium constant of sodium perborate determines the hydrolysis, implying that in practice sodium perborate can be regarded as a solid stable source of hydrogen peroxide.

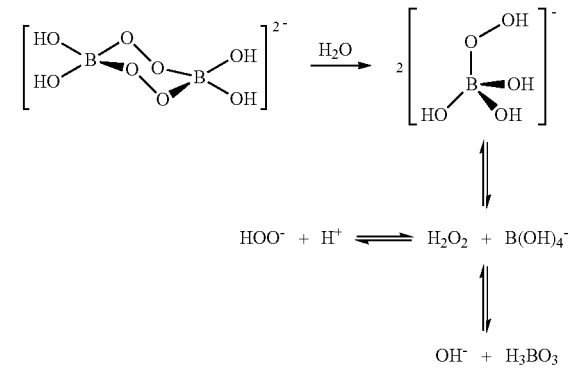

While not being held to any particular theory, as the precise mechanism of oxidation by available oxygen from sodium perborate is not known, it is believed that the perhydroxy anion (HOO—) is the primary oxidizing species.

Additional oxidizing agents include persulfates, including alkali metal persulfates such as sodium persulfate, potassium persulfate, ammonium persulfate, hypochlorites, including alkali metal hypochlorites such as lithium and/or sodium hypochlorites, chlorites, including alkali metal chlorites such as sodium chlorite, bromates, periodates, permanganates, etc.

Enzymes may also be employed as breakers. Different types of enzymes are used to break different types of bonds in the polysaccharides. Some enzymes break only α-glycosidic linkages and some break β-glycosidic linkages in polysaccharides. Some enzymes break polymers by hydrolysis and some by oxidative pathways. Exemplary enzymes include cellulase, hemicellulase, amylase, xanthanase, mannanase, galactomannanase and other enzymes which are active against the long chain polysaccharides. Hemicellulase may be used to break guar polymers and Xanthanase is used to break Xanthan polymers. Enzymes may have 150 amino acids while typical enzymes have 400 to 500 amino acids, and may have a molecular weight in the range of 10,000.

Examples of suitable commercially available oxidizing agents may include VICON NF™, a chlorite oxyanion (i.e., a salt of chlorous acid), SP BREAKER, a sodium persulfate, and OXOL II™, a sodium perborate, OptiKleen™, and HT™ Breaker, each available from Halliburton Energy Services, Inc.

The oxidative breaker can be mixed with a sequestering agent and then provided to a fluid containing a gelling agent. Alternatively, the oxidative breaker can be provided in the same fluid as the gelling agent, however, an activator is sequestered in the sequestering agent until release to initiate or enhance activity of the oxidative breaker to causing breaking of the gel.

The oxidative breaker may be included in a range of from 1 g/L to about 12 g/L, alternatively from about 2.5 g/L to about 10 g/L, alternatively, from about 3 g/L to about 8 g/L, encompassing any value and subset therebetween.

Activator

An activator may be included in the composition. In particular, the activator herein includes an oxidation activator. The activator initiates or increases the rate of the oxidation or production of oxidating species. The oxidation activators react in situ with hydrogen peroxide to generate peracids, which contain more reactive forms of available oxygen for oxidation. Suitable activators include acyl donors, which may be attached, for example, to a phenol or secondary/tertiary nitrogen source.

The acyl donors react with the perhydroxy anion generated by perborate, for example a sodium perborate, in water to form peracids and peracyl anions. Suitable activators may include the presence of a good leaving group (pKa ~6-13). Specific activators include compounds such as ethyl acetate, ethyl acetoacetate (EAA), tetraacetylethylenediamine (TAED), sodium nonanoyloxybenzenesulfonate (NOBS). These exemplary acyl donors may be useful for the preparation of peracid by reaction with a perborate, such as sodium perborate. An exemplary mechanism is shown as follows:

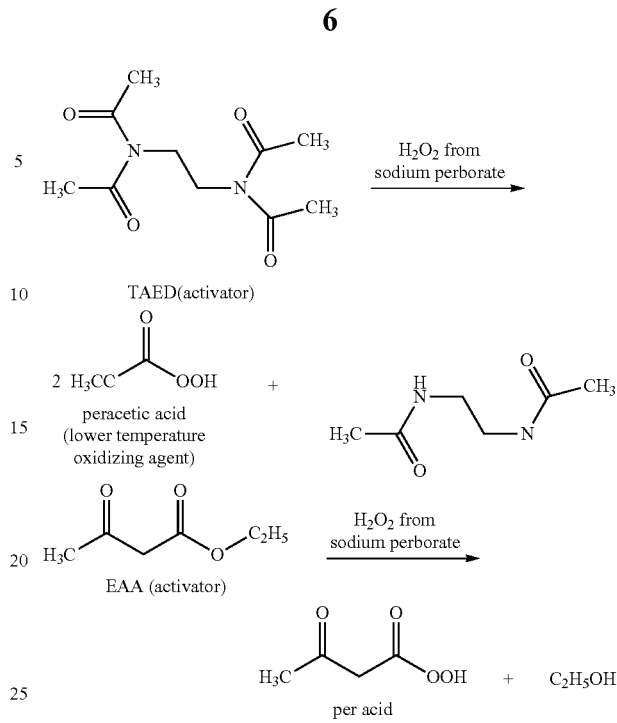

Such activators permit reaction at lower temperatures for example <60° C. For example, upon reaction with sodium perborate, such activators generate peracid at lower temperature, a powerful oxidizing agent which works at lower temperature (<60° C.) due to the enhanced kinetics of peracid in comparison to hydrogen peroxide. The oxidation at lower temperature can be enhanced further by maximizing the heterolysis of the peroxidic bond.

The acyl donor or the activator of the disclosure may have the general formula

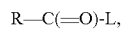

R—C(=O)-L, wherein R is an alkyl group and
L is a leaving group, the conjugate acid of which has a PKa in the range from 6 to 13, alternatively in the range from 6 to 10, and may, for example, be selected from the group —O—Ar,

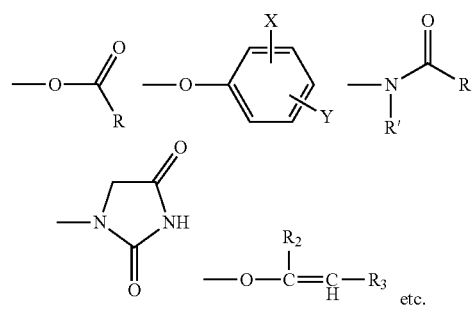

wherein R, R', R2, R3, X, Y=may be alkyl, H, solubilizing group —SO3M, COOM, or a quarternary ammonium, where M is an alkali metal, ammonium or substituted ammonium cation. Exemplary alkali metals include sodium or potassium. wherein R, R', R2, R3, X, Y=may be alkyl, H, solubilizing group —SO3M, COOM, or a quarternary ammonium, where M is an alkali metal, ammonium or substituted ammonium cation. Exemplary alkali metals include sodium or potassium.

Such acyl donors are described for example in the U.S. Pat. No. 4,412,934.

Activators such as EAA, TAED, etc. effectively increase the reactivity of available oxygen from sodium perborate for oxidation.

Another activator available to enhance oxidation of a perborate is a chelated transition-metal ion. Chelated transition-metal ions catalyze peroxy reactions to promote the formation of reactive peroxy or oxo derivatives at lower temperatures. These chelated transition-metal catalyst/activators are believed to have a different mechanism to enhance oxidation than acyl donorsresulting in less metal ion usage in the reaction and less cost with greater economy of chemical usage. Some of the transition metals like manganese, iron, copper and cobalt form complexes that enhance the perborate oxidation properties at lower temperature. The transition-metal ions should be sufficiently chelated to obtain the required delayed break of the polymer and should not unduly permute peroxide decomposition by non-oxidative pathways and should be hydrolytically and oxidatively stable. Exemplary chelating agents include EDTA, an alkali or alkaline metal salt of EDTA, alkali metal citrate, citric acid, iminodiacetic acid, gluconate, NTA, tetraamidomacrocyclic ligand, and any combination thereof in any proportion. The chelated transition metal may be selected from the group consisting of: as copper-EDTA, Fe-citrate, Mn(III)-gluconate, Fe-Tetraamidomacrocyclic ligand, and any combination thereof in any proportion.

The activators and alkanoyl donor activator compounds may be present in a concentration of at least about 0.5% by weight. The concentration may be from about 0.1% to 5%, alternatively, from about 0.5% to about 3%, encompassing any value and subset therebetween. Activators may be present at a ratio of oxidative breaker to activator of from 5:1 to 50:1, alternatively from 10:1 to 25:1, and alternatively from 15:1 to 20:1, encompassing any value and subset therebetween.

Sequestering Agent

The composition disclosed herein includes a sequestering agent that is hydrocarbon miscible and inert to oxidation. The sequestering agent sequesters the oxidative breaker away from the saccharide gelling agent, or otherwise prevents the oxidative breaker from contacting and oxidizing the saccharide gelling agent. The sequestering agent may be a solvent for the oxidative breaker and/or the activator such that the oxidative breaker and/or the activator dissolves in the sequestering agent. The sequestering agent may also sequester the activator away from the oxidative agent such that the oxidation by the oxidative agent proceeds very slowly or not at all. The sequestering agent may be a C2-C40 alkane or a C2-C40 alkyl containing compound.

Alternatively, the carbon sequestering agent may be a C8-C40 alkane or alkyl chain containing compound, alternatively, C16-C30 alkane or alkyl chain containing compound. The sequestering agent may be may be a straight chain or lightly branched, such as 5 or less branches, 4 or less branches, 3 or less branches, 2 or less branches, or 1 less. The branches may be no larger than C5. The sequestering agent may contain no heteroatoms. Alternatively, the sequestering agent may additionally include O as a heteroatom.

The sequestering agent may include any compound having a straight chain C2-C40 alkyl component, such as a C2-C40 alcohol, siloxane, ether, ester, ketone, aldehyde, fatty acids, carboxylic acids or mixture thereof. Alternatively, these may be C8-C40, or C16-C30. The agent inert to oxidation may include surfactants, mineral oils, natural or synthetic oils, waxes, or other the like having a straight chain C2-C40, C8-C40, or C16-C30 alkyl component.

Waxes can be provided to serve as the sequestering agent. Waxes include natural waxes such as beeswax, ricebran wax, jojoba wax, peat wax, candelila wax, carnauba wax, ouricury wax, montan wax and the like and synthetic waxes such as Fischer-Tropsch waxes, copolymers of ethylene, propylene, butadiene and acrylic acid having wax-like properties, substituted amide waxes, chemically modified waxes, e.g., oxidized, saponified and esterified waxes and polyethylene waxes such as POLYWAX® polyethylene waxes (Petrolite Corporation) having a molecular weight (number average) of from about 500 to about 2,000.

The sequestering agent may be a natural or synthetic oil, and may include mineral oil, petroleum oils, natural oils, synthetically-derived oils, diesel oil, fuel oil, kerosene oil, crude oil, light crude oil, mineral oil, synthetic oil, olefins, polyolefins, alpha-olefins, internal olefins, linear or branched paraffins, n-paraffins, iso-paraffins, n-alkanes, cyclic alkanes, branched alkanes, polydiorganosiloxanes, acetals, esters, diesters of carbonic acid or mixtures thereof.

The sequestering agent may be included in a range of from 0.1 to 10% by volume, alternatively from 1 to 5%, alternatively, less than 5%, encompassing any value and subset therebetween.

Base Fluid

The base fluid may include water, saltwater, seawater, brine, freshwater, and the like. A particular fluid includes filtered brine or "clear brine." The brine can be synthetic, made by adding water-soluble salt to freshwater. Brines may include water soluble salts, which can be for example, to weight the treatment fluid, i.e., increase the density. Brines that may be used include monovalent or bivalent salts, and may include salts having for example alkali metals or alkaline earth metals. Particular salts which may be suitable include $CaCl_2$, $CaBr_2$, NaBr, $ZnBr_2$, NaCl, KCl, ZnBr, $NH_4Cl$, cesium formate, potassium formate, sodium formate, and mixtures thereof. The salts can be added from about 0 to 25 pounds per gallon (ppg), or alternatively from 5 to 25 ppg.

The aqueous base fluid may include the saccharide gelling agent and may form viscous gel. The aqueous base fluid may form a first phase whereas the breaker and hydrocarbon miscible component may form a second phase when mixed together.

Alternatively, the base fluid may be oleaginous in character and the oxidative breaker and hydrocarbon miscible component may be in an aqueous fluid. In either case, the oxidative breaker and saccharide gelling agent may be kept in separate phases of the composition.

Proppants

Illustrative proppants that may be used in conjunction with the instant disclosure include proppants, microproppants, ultra light weight proppants, gravel, or any fine or coarse solid particles, including for example, sand, bauxite, ceramic, gravel, glass, polymer materials, polytetrafluoroethylene materials, nut shell pieces, cured resinous particulates having nut shell pieces, seed shell pieces, cured resinous particulates having seed shell pieces, fruit pit pieces, cured resinous particulates having fruit pit pieces, wood, composite particulates, and any combination thereof. Suitable composite particulates may have a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof.

The proppants may be substantially spherical materials, fibrous materials, polygonal materials (such as cubic materials), irregular shapes, and any combination thereof.

The proppant particles utilized in accordance with the present disclosure are generally of a size such that formation particulate solids which migrate with produced fluids are prevented from being produced from the subterranean zone. Generally, the proppant particles have a size in the range of from about 2 to about 400 mesh, U.S. Sieve Series. In some cases, the proppant is graded sand having a particle size in the range of from about 10 to about 70 mesh, U.S. Sieve Series. Sand particle size distribution ranges may be one or more of 10-20 mesh, 20-40 mesh, 40-60 mesh or 50-70 mesh, depending on the particular size and distribution of formation solids to be screened out by the consolidated proppant particles.

Proppants can be included in the composition in a range of from about 0.06% to about 120%, or alternatively from about 1 to about 15% weight/volume (e.g., g/100 ml). Proppants may be present in an amount in the range of from a lower limit of about 0.06%, 1%, 10%, 20%, 25%, 30%, 40%, 50%, to an upper limit of about 120.0%, 100.0%, 80.0%, 75.0%, 70.0%, 60.0%, %, 50%, 40%, 30%, 20%, 15.0 and 7.0% in weight/volume (e.g., g/100 ml), encompassing any value and subset therebetween.

Illustrations

The composition of the present disclosure can be employed in a wide variety of oil and gas and downhole applications. The presently disclosed compositions can be employed in any process where a viscous or gelled fluid is used, and subsequent breaking is needed. Exemplary processes include fracturing fluids, stimulations fluids, production fluids, fluid loss processes, gravel packing processes, as well as conformance applications, spacers for cement applications, pipeline clean-outs, "pigging," industrial cleaning, or the like. Although in the following figures and description, a fracturing process and gravel packing process is described, the use of the presently disclosed composition is not limited to these applications but can be used in a wide variety of applications.

Figure 2:
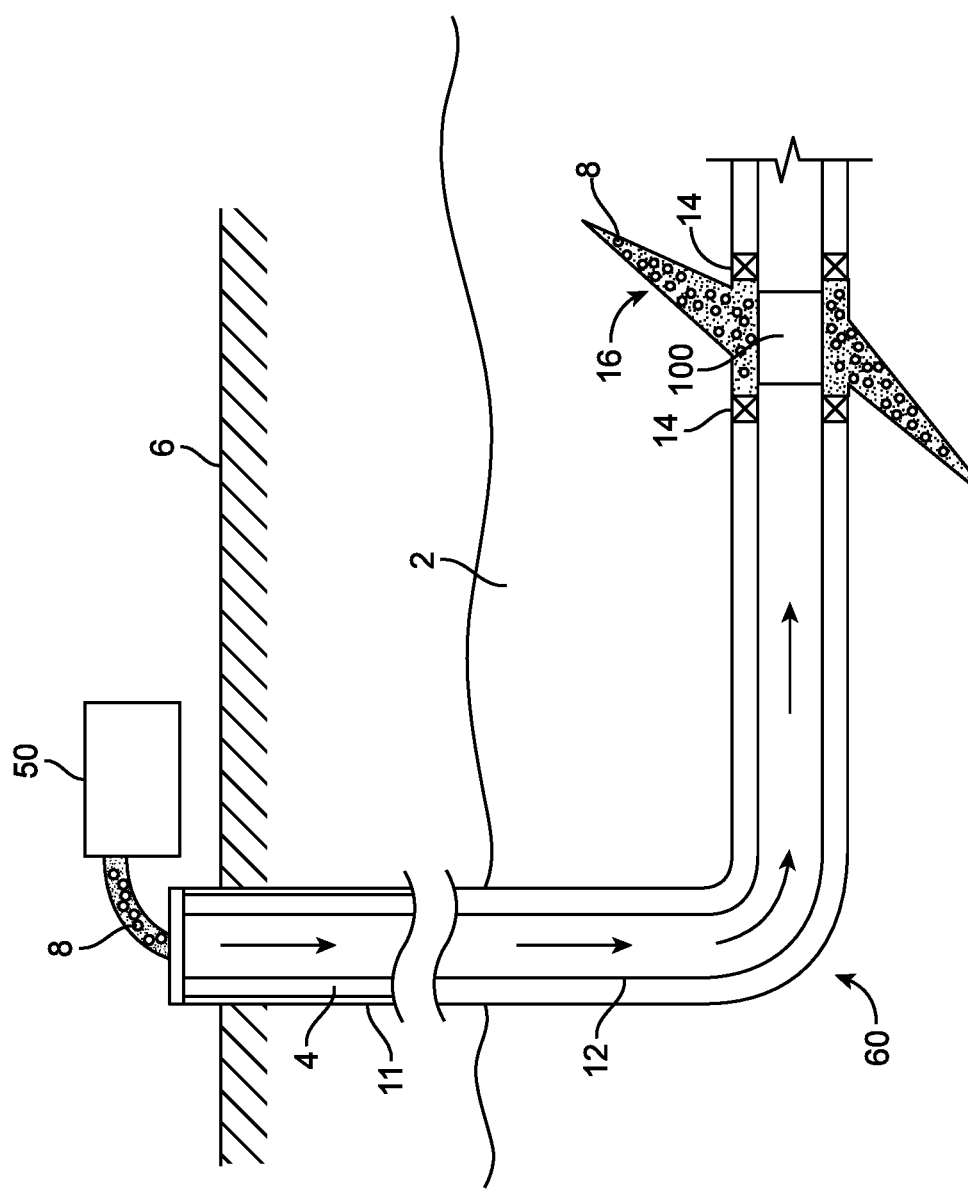
FIG. 2 is a diagram illustrating an example of a subterranean formation in which a fracturing operation may be performed in association with certain aspects of the present disclosure.

An exemplary fracturing system is illustrated in FIGS. 1 and 2. In this example, the system 10 includes a carrier composition, such as fracturing fluid producing apparatus 20, a fluid source 30, a proppant source 40, and a pump and blender system 50 and resides at the surface at a well site where a well 60 is located. The fluid source 30 may include the base fluid as disclosed herein having a mixture of an oleaginous fluid and non-oleaginous fluid. In certain instances, the fracturing fluid producing apparatus 20 combines a saccharide gelling agent from fluid source 30, to produce a hydrated fracturing fluid that is used in fracturing the formation, for example, by being pumped through a work string 12 (see FIG. 2). The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise a base fluid, water, a hydrocarbon fluid, a polymer gel, foam, air, nanoparticles, breakers, wet gases and/or other fluids.

The proppant source 40 can include the proppants as disclosed herein, as well as other proppants, and can be combined with the fracturing fluid. The system may also include breaker source 70 that provides an internal oxidative breaker mixed with the sequestering agent, as disclosed herein.

The pump and blender system 50 receives the fracturing fluid and combines it with other components, including proppant from the proppant source 40 and/or additional fluid from the breaker source 70. The resulting mixture may be pumped down the well 60 and out through a downhole tool, such as tool 100 shown in FIG. 2, or through perforations or apertures of a casing or tubing, under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can distribute fracturing fluid and/or proppant to the target subterranean zone.

FIG. 2 illustrates a fracturing operation being performed on a portion of a subterranean formation of interest 2 surrounding a well bore 4 at well 60. The well bore 4 extends from the surface 6, and the fracturing fluid 8 is applied to a portion of the subterranean formation 2 surrounding the horizontal portion of the well bore through, for example, a downhole tool 100. The tool 100 can include ports, holes, or a sleeve which permits exit of fluid from the work string 12. Alternative to the tool 100, the fracturing fluid 8 may be applied via perforations or other apertures in a casing 11 (when the casing extends that far), work string 12, other piping, or merely directly into the formation. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. In cased wells, perforations can be formed using shape charges, a perforating gun, hydro-jetting and/or other tools.

The well is shown with a work string 12 depending from the surface 6 into the well bore 4. The pump and blender system 50 is coupled to the work string 12 to pump the fracturing fluid 8 into the well bore 4. The work string 12 may include coiled tubing, jointed pipe, and/or other structures that allow fluid to flow into the well bore 4. The work string 12 can include flow control devices that control the flow of fluid from the interior of the work string 12 into the subterranean zone 2.

The work string 12 and/or the well bore 4 may include one or more sets of packers 14 that seal the annulus between the work string 12 and well bore 4 to define an interval of the well bore 4 into which the fracturing fluid 8 will be pumped. FIG. 2 shows two packers 14, one defining an uphole boundary of the interval and one defining the downhole end of the interval. When the fracturing fluid 8 is introduced into well bore 4 at a sufficient hydraulic pressure, one or more fractures 16 may be created in the subterranean zone 2. The proppant particulates in the fracturing fluid 8 may enter the fractures 16 where they may remain after the fracturing fluid flows out of the well bore. These proppant particulates may "prop" fractures 16 such that fluids may flow more freely through the fractures 16.

Figure 3:
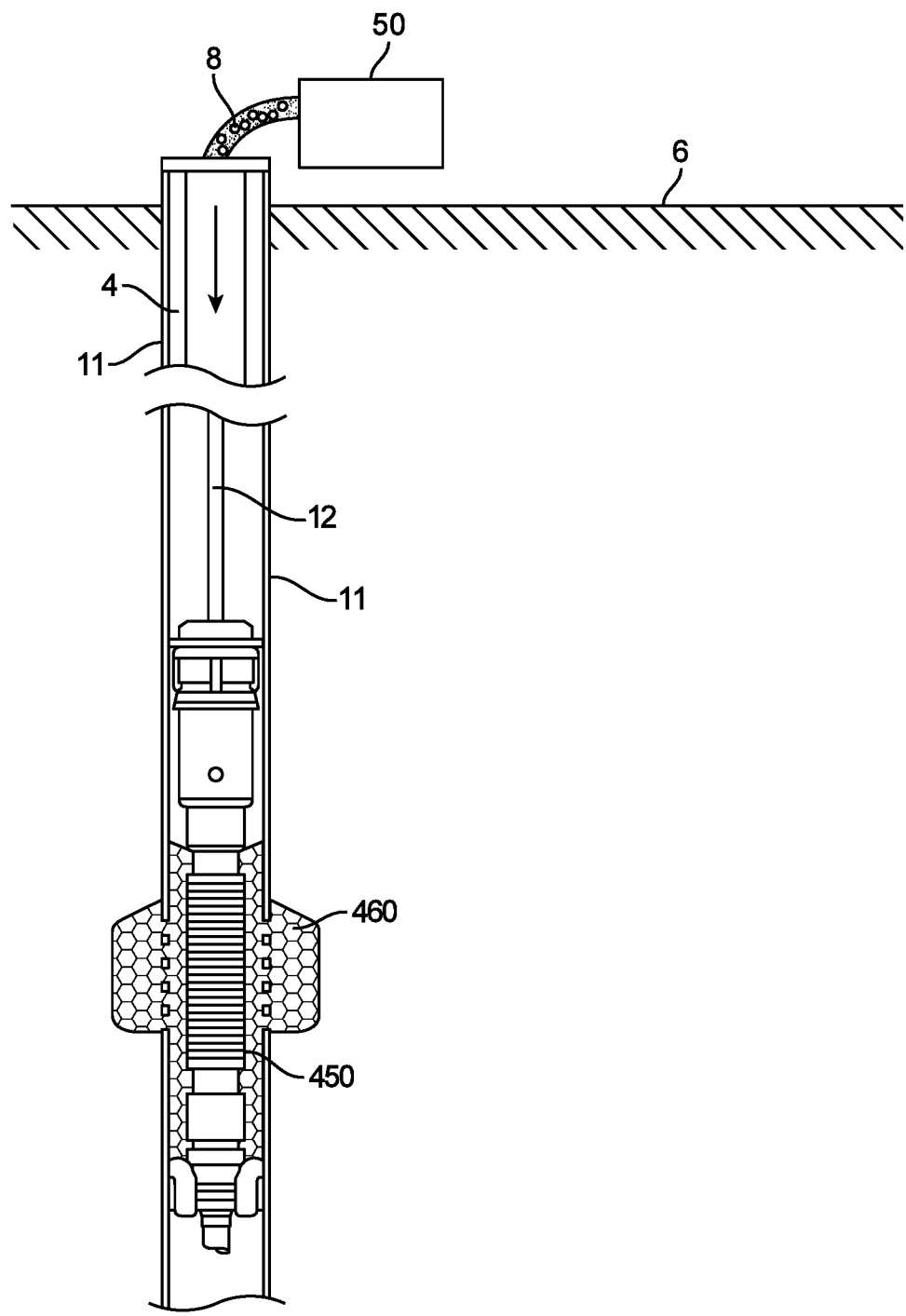
FIG. 3 is a diagram illustrating an example of a subterranean formation in which a gravel packing operation may be performed in association with certain aspects of the present disclosure.

In addition to fracture and diversion operations, the composition disclosed herein may be employed in gravel packing operations as illustrated in FIG. 3. As disclosed therein a screen 450 can be provided within well bore 4. Gravel or sand 460 can packed around the screen 450 to filter the formation sand or unwanted particles. The gravel or sand 460 can be carried downhole via composition from the blender 50.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Numerous examples are provided herein to enhance understanding of the present disclosure. A specific set of statements are provided as follows.

Statement 1: A downhole fluid composition including: a saccharide gelling agent; an oxidative breaker; and a sequestering agent, the sequestering agent being hydrocarbon miscible and inert to oxidation by the oxidative breaker, wherein the sequestering agent sequesters the oxidative breaker or an activator for the oxidative breaker, whereby oxidation of the gelling agent is inhibited.

Statement 2: The downhole fluid composition according to Statement 1, further including an activator for the oxidative breaker.

Statement 3: The downhole fluid composition according to Statement 1 or Statement 2, wherein the oxidative breaker is dissolved in the sequestering agent.

Statement 4: The downhole fluid composition according to Statements 1-3, wherein the saccharide gelling agent is in a first phase, and the sequestering agent and oxidative breaker are in a second phase.

Statement 5: The downhole fluid composition according to Statements 1-4, wherein the first phase includes an aqueous fluid and is immiscible with the sequestering agent.

Statement 6: The downhole fluid composition according to Statements 1-5, wherein the saccharide gelling agent is selected from the group consisting of cellulose, starch, gum, and mixtures thereof.

Statement 7: The downhole fluid composition according to Statements 1-6, wherein the oxidative breaker is a hydrogen peroxide generating compound.

Statement 8: The downhole fluid composition according to Statements 1-7, wherein the oxidative breaker is selected from the group consisting of persalts, alkali perborates, percarbonates, perphosphates, sodium perborate monohydrate, sodium perborate tetrahydrate, sodium percarbonate, sodium pyrophosphate peroxyhydrate, and mixtures thereof.

Statement 9: The downhole fluid composition according to Statements 1-8, wherein the sequestering agent is a selected from a C2-C40 alkane or C2-C40 alkyl chain containing compound.

Statement 10: The downhole fluid composition according to Statements 1-9, wherein the sequestering agent is an oil.

Statement 11: The downhole fluid composition according to Statements 1-10, further including a proppant.

Statement 12: The downhole fluid composition according to Statements 1-11, wherein the sequestering agent is 5% or less of the composition by volume.

Statement 13: A method including introducing a downhole fluid composition into a wellbore, the downhole fluid composition having a saccharide gelling agent; an oxidative breaker; and a sequestering agent, the sequestering agent being hydrocarbon miscible and inert to oxidation by the oxidative breaker, wherein the sequestering agent sequesters the oxidative breaker or an activator for the oxidative breaker, whereby oxidation of the gelling agent is inhibited.

Statement 14: A method according to Statement 13, wherein saccharide gelling agent is selected from the group consisting of cellulose, starch, gum, and mixtures thereof.

Statement 15: A method according to Statement 13 or Statement 14, wherein the oxidative breaker is selected from the group consisting of persalts, alkali perborates, percarbonates, perphosphates, sodium perborate monohydrate, sodium perborate tetrahyd rate, sodium percarbonate, sodium pyrophosphate peroxyhydrate, and mixtures thereof.

Statement 16: A method according to Statements 13 to 15, wherein the sequestering agent is selected from a straight chain C2-C40 alkane or C2-C40 alkyl containing compound.

Statement 17: A method according to Statements 13 to 16, wherein the sequestering agent releases the oxidative agent or an activator for the oxidative agent via contact with a downhole hydrocarbon source.

Statement 18: The method according to Statements 13 to 17, wherein the sequestering agent releases the oxidative agent or an activator for the oxidative agent in temperatures of at least 90° F.

Statement 19: The method according to Statements 13 to 18, wherein the downhole fluid composition is introduced into a subterranean formation using one or more pumps.

Statement 20: The method according to Statements 13 to 19, mixing an oxidative breaker with a sequestering agent which is hydrocarbon miscible and inert to oxidation to form a sequestered oxidative breaker; and providing the sequestered oxidative breaker to a fluid comprising a saccharide gelling agent, whereby the oxidative breaker is sequestered from the saccharide gelling agent.

Statement 21: A downhole fluid composition including a saccharide gelling agent; an oxidative breaker; a sequestering agent, the sequestering agent being hydrocarbon miscible and inert to oxidation by the oxidative breaker; optionally an activator for the oxidative breaker, and wherein the sequestering agent sequesters one of the oxidative breaker or the activator for the oxidative breaker when the activator is present, whereby oxidation of the gelling agent is inhibited.

Statement 22: A downhole fluid composition including a saccharide gelling agent; an oxidative breaker; a sequestering agent, the sequestering agent being hydrocarbon miscible and inert to oxidation by the oxidative breaker; wherein the sequestering agent sequesters the oxidative breaker, whereby oxidation of the gelling agent is inhibited.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

The invention claimed is:

1. A method comprising:
pumping an aqueous base fluid having a saccharide gelling agent into a wellbore;
introducing a delayed breaker composition for the saccharide gelling agent into the wellbore, the delayed breaker composition consisting essentially of
an oxidative breaker; and
a sequestering agent, the sequestering agent being hydrocarbon miscible and inert to oxidation by the oxidative breaker, the sequestering agent being selected from group of mineral oils, natural oils, C2-C40 alkanes, synthetic oils, waxes, and mixtures thereof, wherein the oxidative breaker is dissolved in the
sequestering agent, and wherein the sequestering agent sequesters the oxidative breaker whereby oxidation of the gelling agent is inhibited; and wherein the delayed breaker composition does not comprise a surfactant;
allowing the delayed breaker composition to contact a hydrocarbon within the wellbore thereby releasing the oxidative breaker;
allowing the oxidative breaker to contact and break the saccharide gelling agent.

2. The method of claim 1, wherein saccharide gelling agent is selected from the group consisting of cellulose, starch, gum, and mixtures thereof.

3. The method of claim 1, wherein the oxidative breaker is selected from the group consisting of persalts, alkali perborates, percarbonates, perphosphates, sodium perborate monohydrate, sodium perborate tetrahydrate, sodium percarbonate, sodium pyrophosphate peroxyhydrate, and mixtures thereof.

4. The method of claim 1, wherein the sequestering agent is selected from a straight chain C2-C40 alkane.

5. The method of claim 1, wherein the sequestering agent releases the oxidative breaker in temperatures of at least 90° F.

6. The method of claim 1, wherein the downhole fluid composition is introduced into a subterranean formation using one or more pumps.

7. The method of claim 1, wherein the aqueous phase has a base fluid consisting of brine, saltwater or freshwater.

8. The method of claim 1, wherein the aqueous phase consists of water, salt, proppant, and the saccharide gelling agent.

9. The method of claim 1, wherein the composition further comprises an oxidation activator.

10. A method comprising:
introducing a downhole fluid composition into a wellbore, the composition comprising:
an aqueous phase having a saccharide gelling agent,
a second phase having an oxidative breaker dissolved in a sequestering agent, the sequestering agent being hydrocarbon miscible and inert to oxidation by the oxidative breaker, the sequestering agent being selected from group of mineral oils, natural oils, C2-C40 alkanes, synthetic oils, waxes, and mixtures thereof, and wherein the oxidative breaker is dissolved in the sequestering agent,
and wherein the composition does not contain a surfactant,
allowing the delayed breaker composition to contact a hydrocarbon within the wellbore thereby releasing the oxidative breaker;
allowing the oxidative breaker to contact and break the saccharide gelling.

* * * * *